(12) United States Patent
Madonna

(10) Patent No.: US 7,406,862 B2
(45) Date of Patent: Aug. 5, 2008

(54) APPARATUS AND METHOD FOR INSPECTING BRAKE SYSTEM OF TWO-WHEELED VEHICLE

(75) Inventor: Giuseppe Madonna, Chieti (IT)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 11/645,796

(22) Filed: Dec. 27, 2006

(65) Prior Publication Data

US 2007/0157717 A1   Jul. 12, 2007

(30) Foreign Application Priority Data

Dec. 28, 2005   (JP) .............................. 2005-377134

(51) Int. Cl.
   *G01L 5/28* (2006.01)
(52) U.S. Cl. ........................................ 73/123
(58) Field of Classification Search ............ 73/121, 73/122, 123, 124, 125, 126, 127, 129, 130
   See application file for complete search history.

(56) References Cited

U.S. PATENT DOCUMENTS 6,505,503 B1 * 1/2003 Teresi et al. .................... 73/117
7,134,326 B2 * 11/2006 Fukamachi et al. ........... 73/121

2002/0138189 A1   9/2002 Kubik
2002/0172256 A1   11/2002 Yu

FOREIGN PATENT DOCUMENTS

| EP | 1 482 294 A1 | 12/2004 |
|---|---|---|
| JP | 2001-281108 A | 10/2001 |
| JP | 2003-254870 A | 9/2003 |

* cited by examiner

*Primary Examiner*—Eric S McCall
(74) *Attorney, Agent, or Firm*—Arent Fox LLP

(57) ABSTRACT

An apparatus and a method for inspecting a brake system of a two-wheeled vehicle are provided, which not only can reduce the time required for each inspection of the two-wheeled vehicle to efficiently perform inspection of the two-wheeled vehicle, but also remarkably improve the inspection accuracy. Each wheel of the two-wheeled vehicle is supported by respective corresponding support rollers and an anti-lock brake system and a front and rear wheel interlocking brake system acts on the wheels. Data for rotational speeds of the rollers supporting the wheel acted upon by the anti-lock brake system are measured by measuring encoders 20, 31. Data for temperature of a brake actuating part 45 of the wheel acted upon by the front and rear wheel interlocking brake system is measured by a measuring sensor 46. Pass/fail determination of the brake system is performed by a determination 50 from a first pass/fail determining element obtained by the measuring encoders 20, 31 and a second pass/fail determining element obtained by the measuring sensor 46.

2 Claims, 5 Drawing Sheets

APPARATUS AND METHOD FOR INSPECTING BRAKE SYSTEM OF TWO-WHEELED VEHICLE

BACKGROUND OF THE INVENTION

1. Field of the Invention

The present invention relates to an apparatus and method for inspecting an anti-lock brake system provided in a two-wheeled vehicle and a front and rear wheel interlocking brake system including the anti-lock brake system.

2. Description of the Related Art

Conventionally, apparatuses for inspecting actuation of an anti-lock brake system (hereinafter referred to as ABS) and a front and rear wheel interlocking brake system (hereinafter referred to as CBS) of a two-wheeled vehicle are known (see Japanese Patent Laid-Open No. 2001-281108, for example).

The inspecting apparatus comprises one pair of support rollers (front wheel support rollers) on which a front wheel is situated and supported and one pair of support rollers (rear wheel support rollers) on which a rear wheel is situated and supported, wherein one of the front wheel support rollers and one of the rear wheel support rollers are coupled with each other by coupling means to synchronously rotate. The surface of each roller is formed of a low friction material. In addition, on the other front wheel support roller and the other rear wheel support roller, rotational speed detecting means for detecting rotational speed of the respective roller are provided in a coupled manner. Further, a drive motor is coupled to one of the rear wheel support rollers via a clutch.

In the inspecting apparatus configured in this manner, when the ABS of the two-wheeled vehicle is inspected, the front wheel and the rear wheel of the test vehicle are firstly situated on one pair of the front wheel support rollers and one pair of the rear wheel support rollers, respectively and the rear wheel support roller is rotated by the drive motor. Thereby, both rear wheel support rollers rotate via the rear wheel and this rotation is further transmitted via one front wheel support rollers to the front wheel and the other front wheel support roller, so that all rollers rotate synchronously.

Then, when the rotational speed of the roller obtained from the rotational speed detecting means reaches a predetermined speed, the clutch is brought into the OFF state to disconnect the one rear wheel support roller from the drive motor and an operator fully inputs the brake in this state. Accordingly, each roller which is disconnected from the driving force of the drive motor by means of the clutch continues to inertially rotate, while the rotational speed of each roller gradually decreases due to deceleration by the brake input. Because the surface of each roller is formed of the low friction material, slip occurs between the wheels of the two-wheeled vehicle and the respective rollers so that the ABS actuates to perform pumping brake action. Thereafter, each roller stops by actuation of the brake and then pass/failure determination of the ABS performance is performed by comparing the stop time and a value which is predetermined in actual driving measurement.

Also when the CBS of the two-wheeled vehicle is inspected by the conventional inspecting apparatus, as is the case of the ABS inspection, one of the brakes (e.g. the rear wheel brake) is inputted and the other brake (e.g. the front wheel brake) is interlocked with the former, and pass/fail determination of the CBS performance is performed by comparing the stop time of each roller and a value which is predetermined in actual driving measurement.

However, in the ABS inspection by the conventional inspecting apparatus, the determination result cannot be obtained unless rotation of each support roller stops after the brake input and therefore it is disadvantageous that the inspection time is relatively long. Further, because actuation check of the CBS is performed with physical feeling of the operator, the operator is required to be skilled in the task and it is disadvantageous that high inspection accuracy can not be expected.

Therefore, it has been proposed that increase/decrease in rotational speed of the wheel caused by repetition of ON/OFF of the brake during the ABS actuation is measured to determine a waveform based on this measured data and pass/fail determination of the ABS and CBS is performed by determining whether a part of the waveform is within a predetermined range in a predetermined elapsed time or not (see Japanese Patent Laid-Open No. 2003-254870, for example). According to this approach, the inspection time can be significantly reduced because inspection of the brake system can be performed without sampling the elapsed time from the brake input until the wheel stops.

However, also in this approach, one of the front wheel support rollers and one of the rear wheel support rollers are coupled with each other by the coupling means to synchronously rotate. Therefore, particularly in the CBS inspection, even if increases/decreases in the rotational speeds of the front wheel and the rear wheel are measured, it is disadvantageously not clear whether the increases/decreases in the rotational speeds of both wheels results from the CBS actuation or results from the braking force transmitted from one wheel to the other wheel through the coupling means.

Thus, in some two-wheeled vehicles provided with the CBS, the braking forces may be differently distributed in interlocking the rear wheel brake and the front wheel brake. In such a two-wheeled vehicle, for example, if the braking force for the front wheel brake actuation by the CBS is set to be remarkably smaller than that for the rear wheel brake at the time of fully inputting the rear wheel brake, it is conceivable that the increase/decrease in the rotational speed of the front wheel may not result from the actual actuation by the front wheel brake, but from the effect of the braking force of the rear wheel transmitted to the front wheel through the coupling means. If the pass/fail determination is performed based on the measured data which is sampled in such a condition, the interlock by the CBS can be determined to be successful even though the front wheel brake does not actuate, which results in a disadvantage of reducing the inspection accuracy.

To solve the above described disadvantages, it is an object of the present invention to provide an apparatus and a method for inspecting a brake system of a two-wheeled vehicle, which not only can reduce the time required for each inspection of the two-wheeled vehicle to efficiently perform the inspection of the two-wheeled vehicle, but also remarkably improve the inspection accuracy.

SUMMARY OF THE INVENTION

In order to accomplish the object, the present invention provides an apparatus for inspecting a brake system of a two-wheeled vehicle, the apparatus inspecting actuation of an anti-lock brake system and a front and rear wheel interlocking brake system provided in the two-wheeled vehicle, comprising one pair of rotatable support rollers for supporting a front wheel of the two-wheeled vehicle, axes of the support rollers being parallel to each other; one pair of rotatable support rollers for supporting a rear wheel of the two-wheeled vehicle, axes of the support rollers being parallel to each other; coupling means for coupling at least one of the support rollers supporting the front wheel with at least one of the support rollers supporting the rear wheel to synchronously rotate them; first measuring means for measuring rotational speed of a wheel through the support roller supporting the wheel, when the anti-lock brake system actuates for each wheel of the two-wheeled vehicle; second measuring means for measuring temperature of at least a part of at least one of a brake actuating part provided on the front wheel and a brake actuating part provided on the rear wheel; and determining means for performing pass/fail determination of the brake system from a first pass/fail determining element based on data measured by the first measuring means and a second pass/fail determining element based on data measured by the second measuring means.

Further, the present invention provides a method for inspecting a brake system of a two-wheeled vehicle, the method inspecting actuation of an anti-lock brake system and a front and rear wheel interlocking brake system provided in the two-wheeled vehicle, comprising a brake inputting step for actuating the anti-lock brake system and the front and rear wheel interlocking brake system by fully inputting a brake of one wheel while rotating a front wheel of the two-wheeled vehicle supported on one pair of front wheel support rollers and rotating a rear wheel of the two-wheeled vehicle supported on one pair of rear wheel support rollers; a first measuring step for measuring rotational speed of the front wheel and rotational speed of the rear wheel in the brake inputting step through the respective support rollers; a second measuring step for measuring temperature of at least a part of at least one of a brake actuating part provided on the front wheel and a brake actuating part provided on the rear wheel in the brake inputting step; and a determining step for performing pass/fail determination of the brake system from a first pass/fail determining element based on data measured in the first measuring step and a second pass/fail determining element based on data measured in the second measuring step.

In inspection of actuation of the anti-lock brake system (ABS) and the front and rear wheel interlocking brake system (CBS) of the two-wheeled vehicle according to the present invention, the front wheel and the rear wheel are firstly situated on one corresponding pair of the support rollers, respectively. Then, the ABS is actuated by inputting the brake of the wheel (the front wheel or the rear wheel) acted upon by the ABS to be inspected of the two-wheeled vehicle. Specifically, for example, the operator drives an engine of the two-wheeled vehicle on the support rollers and, when the speed reaches a predetermined inspection start speed, fully inputs the brake with a gear of the two-wheeled vehicle in the neutral state (the brake inputting step). Thereby, the wheel is subjected to sudden braking and accordingly slip phenomenon occurs between the wheel and the roller so that the ABS begins to actuate. By fully inputting the brake of the one wheel acted upon by the ABS to be inspected of the two-wheeled vehicle, the brake of the other wheel acted upon by the CBS to be inspected of the two-wheeled vehicle is automatically inputted. Then, the ABSs of both wheels begin to actuate.

By actuation of both the front wheel ABS and the rear wheel ABS, ON/OFF of the brake is repeated for each of the front wheel and the rear wheel so that the rotational speeds of both wheels increase/decrease accordingly, and the rotational speeds of the front wheel support roller and the rear wheel support roller, to which rotational behaviors of both wheels are transmitted, are measured by the first measuring means (the first measuring step).

Then, a first pass/fail determining element based on the measured date obtained from the first measuring means, for example, specifically a waveform associated with change in rotational speed of the wheel (increase/decrease in deceleration or acceleration, for example) calculated based on the measured value obtained from the first measuring means is determined and it is determined whether a part of the waveform is within a predetermined range in a predetermined elapsed time or not, by the determining means. In this way, by using the first pass/fail determining element based on the measured date obtained from the first measuring means in the determination by the determining means, pass/fail determination of the ABSs of both wheels can be performed without sampling the elapsed time from the brake input until the wheels stop. In addition, because the first pass/fail determining element also indicates the effect of the rear wheel brake in relative to the front wheel brake, it can be checked that one wheel brake excessively actuates in relative to the other wheel brake or one wheel brake insufficiently actuates in relative to the other wheel brake, and pass/fail determination of the CBS can be performed without sampling the elapsed time from the brake input until the wheels stop.

Further, when the support rollers of respective wheels are synchronously rotated via the coupling means, the braking force at the time of fully inputting the brake of one wheel affects the other wheel via the coupling means. Therefore, it is conceivable that the rotational speed of the other wheel may decreases, even if the CBS does not actuate and the brake of the other wheel is not automatically inputted. In this case, the accuracy of pass/fail determination of the CBS can be reduced, when only the first pass/fail determining element based on the measured data obtained from the first measuring means is used.

Thus, in the present invention, temperature of at least one of a brake actuating part provided on the front wheel and a brake actuating part provided on the rear wheel, i.e. temperature of at least a part of the brake actuating part of the other wheel acted upon by the CBS to be inspected of the two-wheeled vehicle is measured by the second measuring means (the second measuring step). Then, a second pass/fail determining element based on the measured date obtained from the second measuring means, for example specifically, temperature change (differential) of the brake actuating part based on the measured values obtained from the second measuring means is determined and it is determined whether this temperature change occurs sufficiently or not, by the determining means.

In this way, according to the present invention, because pass/fail determination of the brake system is performed from the first pass/fail determining element based on measured data of the first measuring means and the second pass/fail determining element based on measured data of the second measuring means, not only the inspection time can be reduced, but also the inspection accuracy can be remarkably improved.

DETAILED DESCRIPTION OF THE PREFERRED EMBODIMENTS

Figure 1:
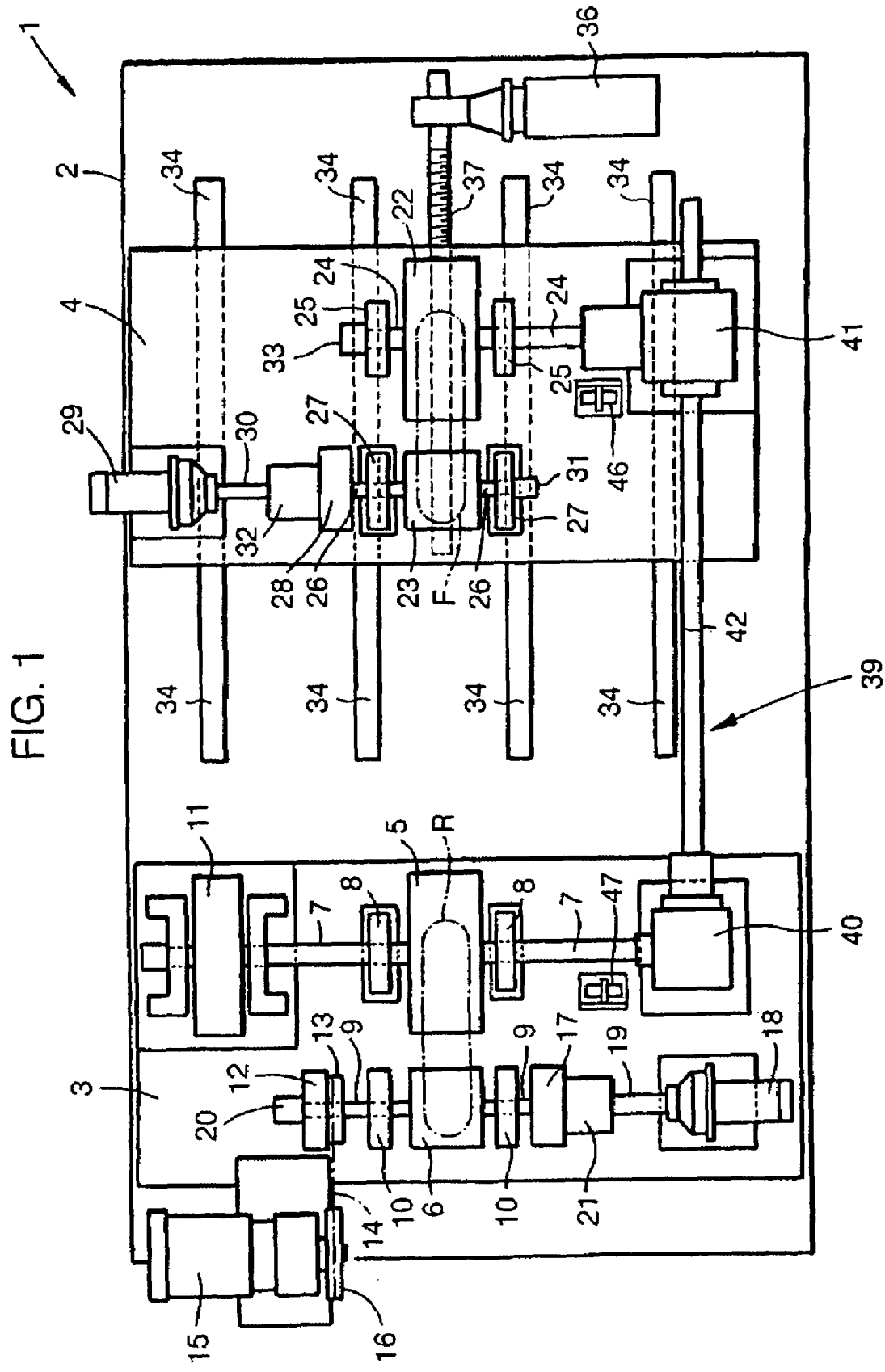
FIG. 1 is an illustrative plan view showing an apparatus configuration of one embodiment of the present invention.
Figure 3:
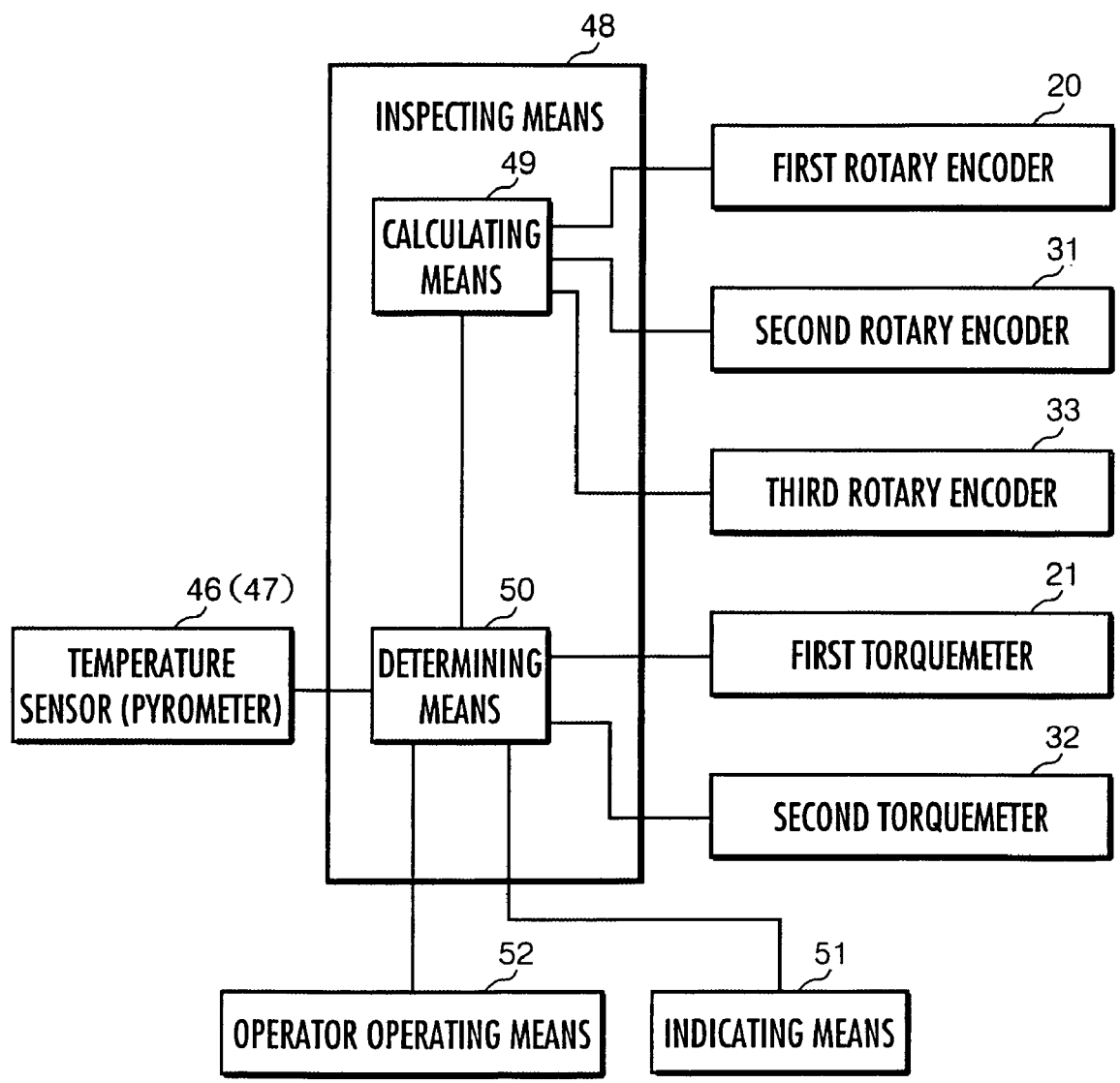
FIG. 3 is a block view schematically showing the apparatus configuration of this embodiment.
Figure 4:
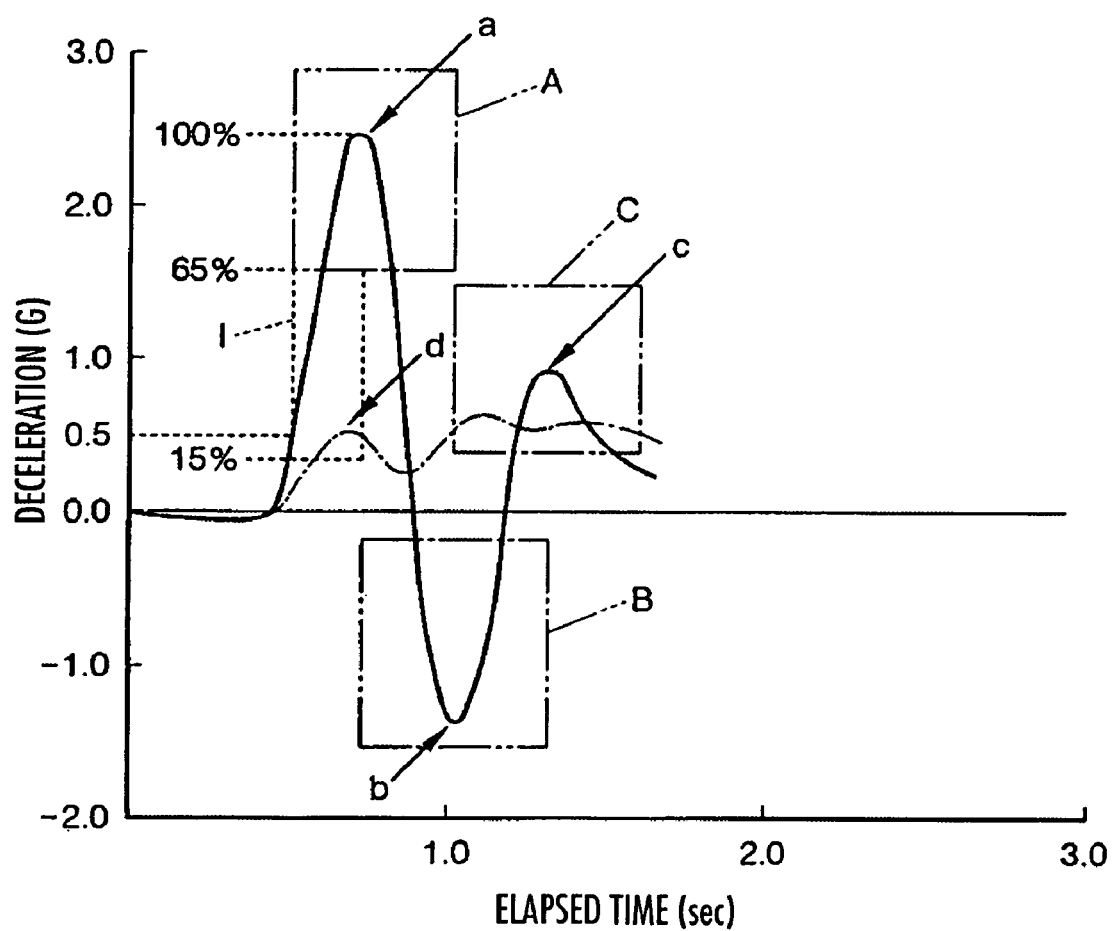
FIG. 4 is a diagram showing waveforms used in determining means.
Figure 5:
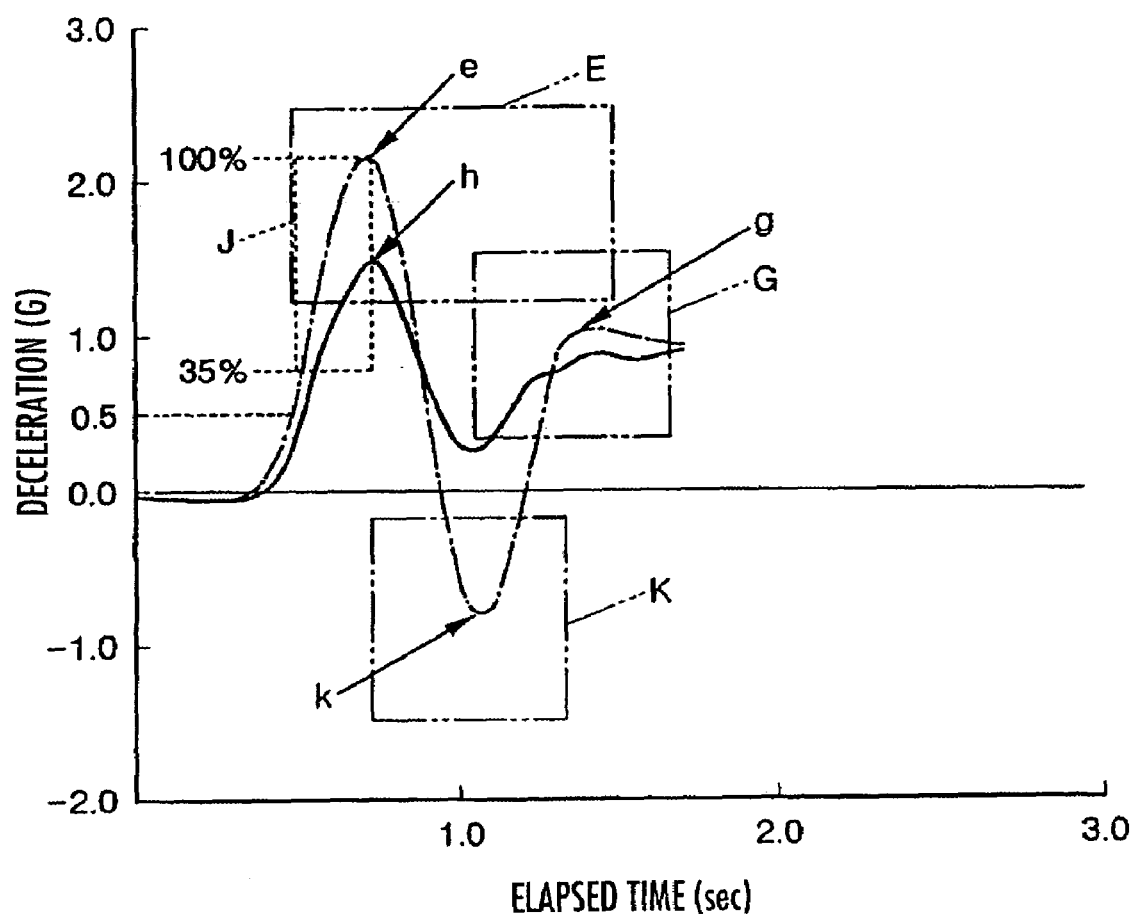
FIG. 5 is a diagram showing waveforms used in determining means.

One embodiment of the present invention will be described with reference to the drawings. FIG. 1 is an illustrative plan view showing an apparatus configuration of this embodiment, FIG. 2 is an illustrative side view showing main parts of the apparatus shown in FIG. 1, FIG. 3 is a block view schematically showing inspecting means of this embodiment, and FIGS. 4 and 5 are diagrams showing waveforms used in determining means.

Figure 2:
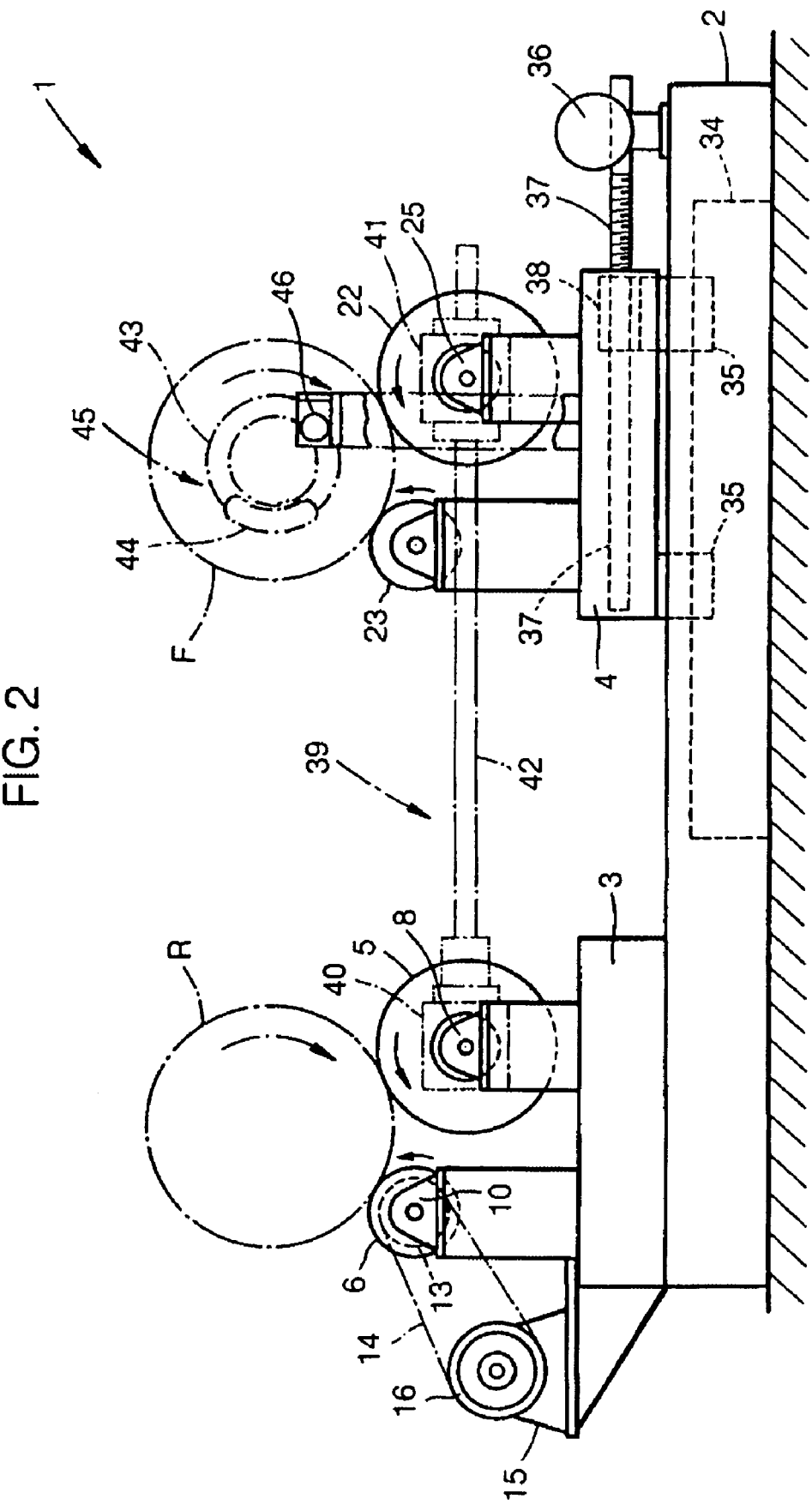
FIG. 2 is an illustrative side view showing main parts of the apparatus shown in FIG. 1.

In FIGS. 1 and 2, reference numeral 1 denotes a two-wheeled vehicle inspecting apparatus 1 of this embodiment, reference numeral 2 denotes a base, reference numeral 3 denotes a rear wheel stand provided on the base 2 and in the rear wheel R side of the two-wheeled vehicle (not shown) and reference numeral 4 denotes a front wheel stand provided in the front wheel F side.

As shown in FIG. 1, the rear wheel stand 3 comprises one pair of rear wheel support rollers 5, 6 on which the rear wheel R of the two-wheeled vehicle is situated and supported. The first rear wheel support roller 5 located in the front side of the rear wheel R has its rotating shaft 7 which is rotatably supported through one pair of bearings 8. The second rear wheel support roller 6 located in the rear side of the rear wheel R has its rotating shaft 9 which is parallel to the rotating shaft 7 of the first rear wheel support roller 5 and rotatably supported through one pair of bearings 10. The first rear wheel support roller 5 is formed to have a larger size than the second rear wheel support roller 6 so that rotational inertial force of the first rear wheel support roller 5 is set to be larger than that of the second rear wheel support roller 6.

The first rear wheel support roller 5 and the second rear wheel support roller 6 are disposed side by side with a predetermined spacing and further the second rear wheel support roller 6 is supported by the bearings 10 so that its contact position to the rear wheel R is at the same height as that of the first rear wheel support roller 5 as shown in FIG. 2.

As shown in FIG. 1, an electromagnetic brake 11 is coupled on one end of the rotating shaft 7 of the first rear wheel support roller 5 so as to allow adjustment of load applied to the first rear wheel support roller 5 by actuation of the electromagnetic brake 11.

On one end of the rotating shaft 9 of the second rear wheel support roller 6, a pulley 13 is provided via a clutch 12. The pulley 13 is driven by a pulley 16 of a starter actuating motor 15 provided on the base 2, with a belt 14 as an interlocking member. When the clutch 12 is in the ON state, the pulley 13 is coupled to the rotating shaft 9 to allow the starter actuating motor 15 to drive the second rear wheel support roller 6.

Further, on the other end of the rotating shaft 9 of the second rear wheel support roller 6, a motor 18 is coupled via a clutch 17. When the clutch 17 is in the ON state, the rotating shaft 9 and a driving shaft 19 of the motor 18 are connected to allow the motor 18 to drive the second rear wheel support roller 6.

Moreover, on the one end of the rotating shaft 9 of the second rear wheel support roller 6, a first rotary encoder 20 is provided for measuring rotational speed of the rotating shaft 9 and on the other end of the rotating shaft 9, a first torquemeter 21 is provided which is located between the clutch 17 and the motor 18 to measure rotational torque of the rotating shaft 9. As described hereinafter, the first torquemeter 21 is used in inspection of braking force and the first rotary encoder 20 is used in inspection of an anti-lock brake system (ABS) and a front and rear wheel interlocking brake system (CBS).

The front wheel stand 4 comprises one pair of front wheel support rollers 22, 23 on which the front wheel F of the two-wheeled vehicle is situated and supported. The first front wheel support roller 22 located in the front side of the front wheel F has its rotating shaft 24 which is rotatably supported through one pair of bearings 25. The second front wheel support roller 23 located in the rear side of the front wheel F has its rotating shaft 26 which is parallel to the rotating shaft 24 of the first front wheel support roller 22 and rotatably supported through one pair of bearings 27. The first front wheel support roller 22 is formed to have a larger size than the second front wheel support roller 23 so that rotational inertial force of the first front wheel support roller 22 is set to be larger than that of the second front wheel support roller 23.

The first front wheel support roller 22 and the second front wheel support roller 23 are disposed side by side with a predetermined spacing and further the second front wheel support roller 23 is supported by the bearings 27 so that its contact position to the front wheel F is at the same height as that of the first front wheel support roller 22 as shown in FIG. 2. The first rear wheel support roller 5 and the first front wheel support roller 22 have the same shape, while the second rear wheel support roller 6 and the second front wheel support roller 23 have the same shape.

On one end of the rotating shaft 26 of the second front wheel support roller 23, a motor 29 is coupled via a clutch 28. When the clutch 28 is in the ON state, the rotating shaft 26 and a driving shaft 30 of the motor 29 are connected to allow the motor 29 to drive the second front wheel support roller 23.

On the other end of the rotating shaft 26 of the second front wheel support roller 23, a second rotary encoder 31 is provided for measuring rotational speed of the rotating shaft 26 and in the one end side of the rotating shaft 26, a second torquemeter 32 is provided which is located between the clutch 28 and the motor 29 to measure rotational torque of the rotating shaft 26. As described hereinafter, the second torquemeter 32 is used in inspection of the braking force and the second rotary encoder 31 is used in inspection of the anti-lock brake system (ABS) and the front and rear wheel interlocking brake system (CBS).

Further, on one end of the rotating shaft 24 of the first front wheel support roller 22, a third rotary encoder 33 is provided for measuring rotational speed of the rotating shaft 24. As described hereinafter, the third rotary encoder 33 is used in inspection of a speedometer provided in the two-wheeled vehicle.

The front wheel stand 4 can move forwardly and backwardly in relation to the rear wheel stand 3 in order to also cope with two-wheeled vehicles with different wheel-to-wheel distances. That is, the front wheel stand 4 comprises a guide member 35 which is guided along a slide rail 34 provided on the base 2 and a screw member 38 which engages to a ball screw 37 rotated by the motor 36, as shown in FIG. 2. Thereby, the front wheel stand 4 is moved forwardly and backwardly in relation to the rear wheel stand 3 along the slide rail 34 by rotating the ball screw 37 by the motor 36.

Further, the first front wheel support roller 22 and the first rear wheel support roller 5 are synchronously rotated via coupling means 39. The coupling means 39 comprises a first gear box 40 which is coupled to the rotating shaft 7 of the first rear wheel support roller 5 and a second gear box 41 which is coupled to the rotating shaft 24 of the first front wheel support roller 22, so that the rotating shaft 7 and the rotating shaft 24 synchronously rotate by means of a coupling shaft 42 which couples the first gear box 40 and the second gear box 41 to each other. The first gear box 40 and the second gear box 41 are the well-known gear boxes configured by combining bevel gears, and a spline shaft is employed as the coupling shaft 42, which is spline-fit in the second gear box 41 side in order to cause the second gear box 41 to follow the above described forward and backward movement of the front wheel stand 4.

Moreover, the two-wheeled vehicle to be here inspected comprises a brake actuating part 45 which is composed of a brake disk 43 and a caliper 44 in each wheel F, R, as shown in FIG. 2 with phantom lines. In addition, as shown in FIG. 1, a temperature sensor 46 is provided on the front wheel stand 4. The temperature sensor 46 measures temperature of the brake disk 43 which comprises the brake actuating part 45 provided on the front wheel F, in a non-contact manner as shown in FIG. 2. As the temperature sensor 46 here employed, a pyrometer is preferable which detects infra-red ray radiated from the brake disk 43 to output surface temperature of the brake disk 43. Heat measured by this temperature sensor 46 is heat which is converted from kinetic energy of the front wheel F and transferred to the brake disk 43 when a piston of the caliper 44 fixed to a front fork (not shown) presses the brake disk 43 rotating with the front wheel F to generate the braking force.

As shown in FIG. 3, all of the first rotary encoder 20, the second rotary encoder 31, the third rotary encoder 33, the first torquemeter 21, the second torquemeter 32, and the temperature sensor 46 are connected to the inspecting means 48 and signals for respective measured values are inputted to the inspecting means 48. The inspecting means 48 comprises calculating means 49 for performing appropriate calculation from each measured value for each inspection and determining means 50 for performing pass/fail determination of each inspection. Further, indicating means 51 for indicating determination results from the determining means 50 or measurement information, as well as operator operating means 52 for allowing an operator to perform operations while he/she rides in the two-wheeled vehicle, are connected to the inspecting means 48. The calculation processing performed by the calculating means 49 and the determination processing performed by the determining means 50 will be described hereinafter.

Next, inspection of the two-wheeled vehicle by the inspecting apparatus 1 of this embodiment will be described. However various types of two-wheeled vehicles are inspected by the inspecting apparatus 1, inspection of the two-wheeled vehicle in which the ABS actuates for each of the front wheel brake and the rear wheel brake and the CBS actuates to interlock the front wheel brake with the rear wheel brake will be firstly described, although it is not shown. In this type of two-wheeled vehicle, when a driver operates only a right brake lever provided on a handle, the front wheel brake actuates and the rear wheel brake also actuates in conjunction with the front wheel brake actuation. Also when the driver operates only a brake pedal, the front wheel brake actuates and the rear wheel brake actuates in conjunction with the front wheel brake actuation. Further, the ABS actuates for both the front wheel brake and the rear wheel brake.

Inspection for this type of two-wheeled vehicle is carried out in the order of front wheel braking force inspection, rear wheel braking force inspection, speedometer inspection, front wheel ABS and CBS inspection, and rear wheel ABS and CBS inspection.

The front wheel braking force inspection is carried out in the following manner. At the start of the inspection, the operator rides in the two-wheeled vehicle and the rear wheel R of the two-wheeled vehicle is situated on the first rear wheel support roller 5 and the second rear wheel support roller 6 and the front wheel F is situated on the first front wheel support roller 22 and the second front wheel support roller 23. At this time, in the two-wheeled vehicle, the engine is stopped and the gear is in the neutral state. On the other hand, in the inspecting apparatus 1, the clutch 12 is in the OFF state to disconnect the pulley 13 from the rotating shaft 9 so that load generated by the motor 15, the pulley 16, and the belt 14 is not applied to the rotating shaft 9 and the second rear wheel support roller 6. Further, the clutch 17 is in the ON state to connect the rotating shaft 9 and the motor 18. Therefore, the motor 18 can drive the second rear wheel support roller 6 via the rotating shaft 9.

Then, the operator, who rides in the two-wheeled vehicle, fully inputs the front wheel brake by operating only the right brake lever and, while keeping this state, pushes a front wheel brake braking force inspection start button (not shown) in the operator operating means 52 (shown in FIG. 3). Thereby, the motors 18, 29 actuate to cause the second rear wheel support roller 6 and the second front wheel support roller 23 to rotate in a predetermined time. At this time, because the front wheel brake is fully inputted from the right brake lever of the two-wheeled vehicle by the operator, rotation of the front wheel F and rotation of the rear wheel R due to the CBS actuation are inhibited so that friction generates between the second front wheel support roller 23 and the second rear wheel support roller 6 and the front wheel F and the rear wheel R. As a result, strain generates in the motors 18, 29, the rotating shaft 9 of the second rear wheel support roller 6, and the rotating shaft 26 of the second front wheel support roller 23 and torque is measured by the torquemeters 32, 21 and inputted in the inspecting means 48 shown in FIG. 3, the torque being applied to the second front wheel support roller 23 and the second rear wheel support roller 6 when the front wheel brake is fully inputted. In the inspecting means 48, the torque value measured by the torquemeters 32, 21 and a predetermined torque value (a preset determination value) are compared by the determining means 50. If the maximum value of the measured torque is larger than the predetermined torque value, "OK" is indicated on the indicating means 51, while if the maximum value of the measured torque is equal to or smaller than the predetermined torque value, it is considered that enough braking force is not obtained and "NG" is indicated on the indicating means 51. Then, if the braking force is "NG", the two-wheeled vehicle is removed from the inspecting apparatus 1 to adjust the brake, while if the braking force is "OK", the rear wheel braking force inspection is subsequently carried out.

The rear wheel braking force inspection is carried out after rotation of the second rear wheel support roller 6 and the second front wheel support roller 23 is stopped by stopping the motors 18, 29. The description of the inspection procedures is herein omitted because they are the same procedures as in the front wheel braking force inspection described above, except that the operator steps on the brake pedal with the right brake lever released in order to fully input the rear wheel brake.

After the rear wheel braking force inspection is completed, the speedometer inspection is subsequently carried out. In the speedometer inspection, pass/fail inspection of the speedometer provided in the two-wheeled vehicle is performed. Referring to FIG. 1, the inspecting apparatus 1 is in the condition described below. That is, the clutch 12 is in the OFF state to disconnect the pulley 13 from the rotating shaft 9 so that load generated by the motor 15, the pulley 16, and the belt 14 is not applied to the rotating shaft 9 and the second rear wheel support roller 6. The clutch 17 is in the OFF state to disconnect the rotating shaft 9 from the motor 18 and the first torquemeter 21 so that load generated by the motor 18 and the first torquemeter 21 is not applied to the rotating shaft 9 and the second rear wheel support roller 6. Similarly, the clutch 28 is in the OFF state so that load generated by the motor 29 and the second torquemeter 32 is not applied to the rotating shaft 26 and the second front wheel support roller 23.

The operator starts the engine of the two-wheeled vehicle and then adjusts an accelerator while observing the speedometer provided in the two-wheeled vehicle. When the speedometer of the two-wheeled vehicle indicates a predetermined speed (e.g. 40 km/h), the operator pushes a speedometer inspection button (not shown) provided on the operator operating means 52 (shown in FIG. 3). On the other hand, as shown in FIG. 3, in the inspecting means 48, rotational speed of the first front wheel support roller 22 obtained from the third rotary encoder 33 is converted into vehicle speed by the calculating means 49. Then, in the determining means 50, if the difference between the value indicated on the speedometer of the two-wheeled vehicle at the time of pushing the speedometer inspection button and the vehicle speed calculated by the calculating means 49 is within a preset acceptable range, "OK" is indicated on the indicating means 51, while if the difference is not within the acceptable range, it is considered that the speedometer of the two-wheeled vehicle is not enough accurate and "NG" is indicated on the indicating means 51.

Subsequently, the front wheel ABS and CBS inspection is carried out. In the front wheel ABS and CBS inspection, the drive by the engine of the two-wheeled vehicle is kept continuously from the speedometer inspection and the operator adjusts to set the accelerator into a predetermined inspection start speed (e.g. 60 km/h). Here, the operator adjusts the accelerator while observing vehicle speed indicated on the indicating means 51 through the inspecting means 48, instead of the indication of the speedometer provided in the two-wheeled vehicle. By keeping the drive by the engine of the two-wheel vehicle, rotation of each of the support rollers 5, 22, 6, 23 is kept and therefore the speed-up time until the vehicle speed reaches the predetermined inspection start speed can be remarkably reduced.

When the vehicle speed reaches the predetermined inspection start speed, the operator releases the accelerator of the two-wheeled vehicle and brings the gear into the neutral state and at the same time fully inputs the front wheel brake by operating the right brake lever. As a result, the two-wheeled vehicle is subjected to sudden braking at the front wheel F. In the inspecting apparatus 1, because rotational inertial forces of the first rear wheel support roller 5 and the first front wheel support roller 22 are larger than rotational inertial forces of the second rear wheel support roller 6 and the second front wheel support roller 23 as shown in FIG. 2, slip phenomenon occurs between the front wheel F and the first front wheel support roller 22 due to the full input of the front wheel brake, so that the front wheel ABS begins to actuate. On the other hand, the second front wheel support roller 23 follows rotational behavior of the front wheel F. In addition, because the first rear wheel support roller 5 is synchronously rotated with the first front wheel support roller 22 via the coupling means 39, the condition of the road surface is also reproduced for the rear wheel R. Further, due to the input of the front wheel brake of the two-wheeled, the CBS actuates to cause the rear wheel brake to actuate. Moreover, the rear wheel R of the two-wheeled vehicle follows the front wheel F so that the ABS actuates. Also in this case, as is the case of the front wheel F, the second rear wheel support roller 6 follows rotational behavior of the rear wheel R.

In the inspecting means 48, rotational speeds of the second front wheel support roller 23 and the second rear wheel support roller 6 are continuously measured by the second rotary encoder 31 and the first rotary encoder 20 and a processing of calculating respective deceleration (acceleration) in the front wheel F side and the rear wheel R side from the measured value is performed by the calculating means 49. Waveforms corresponding to the deceleration (acceleration) here obtained are shown in FIG. 4. In FIG. 4, a waveform shown with a solid line is the waveform in the front wheel F side, i.e. the waveform for deceleration (acceleration) calculated based on the number of revolutions of the second front wheel support roller 23, while a waveform shown with a chain line is the waveform in the rear wheel R side, i.e. the waveform for deceleration (acceleration) calculated based on the number of revolutions of the second rear wheel support roller 6. Although the waveforms of deceleration (acceleration) will be described in this embodiment, the same waveform can be obtained with torque instead of deceleration, as well.

As shown in FIG. 4, the waveform for deceleration (acceleration) calculated based on the number of revolutions of the second front wheel support roller 23 rises (deceleration) at the instant when the front wheel brake is fully inputted and falls (acceleration) through a first change part a. The first change part a corresponds to change in rotational speed of the second front wheel support roller 23 at the time when the front wheel brake is initially in the OFF state by actuation of the ABS and the following fall is caused by rotational inertia of the first front wheel support roller 22 transmitted to the second front wheel support roller 23 through the front wheel F.

When the brake is in the ON state again, a second change part b appears and the second front wheel support roller 23 decelerates. Then, when the brake is in the OFF state again, a third change part c appears and the second front wheel support roller 23 accelerates. Thereafter, by actuation of the ABS, ON/OFF of the front wheel brake is repeated several times.

The waveform for deceleration (acceleration) calculated based on the number of revolutions of the second rear wheel support roller 6 corresponds to change in rotational speed of the second rear wheel support roller 6 due to the fact that the CBS actuates to interlock the rear wheel brake with the front wheel brake and then the ABS in the rear wheel R side actuates. Then, a first change part d appears at the time when the rear wheel brake is initially in the OFF state by actuation of the ABS.

In the determining means 50 of the inspecting means 48, pass/fail determination of the front wheel ABS actuation is performed by sampling the first change part a, the second change part b, and the third change part c from the waveform for deceleration (acceleration) in the front wheel F side, while pass/fail determination of the CBS actuation is performed by sampling the first change part a in the waveform for deceleration (acceleration) in the front wheel F side and the first change part d in the waveform for deceleration (acceleration) in the rear wheel R side.

In other words, for the first change part a in the waveform for deceleration (acceleration) in the front wheel F side, a preset first pass area A (a region enclosed with a two-dot chain line in FIG. 4) is provided. The first pass area A has a base point in time when the deceleration calculated by the calculating means 49 based on the measured value of the second rotary encoder 31 (see FIG. 1) reaches 0.5 G (when it is considered that the deceleration is based on actuation of the brake) and the area A is defined by an upper limit and a lower limit of acceptable deceleration in a predetermined time. For the second change part b in the waveform for deceleration (acceleration) in the front wheel F side, a preset second pass area B is provided. The second pass area B has a base point in time when the first change part a appears and the area B is defined by an upper limit and a lower limit of acceptable deceleration in a predetermined time. Similarly, for the third change part c in the waveform for deceleration (acceleration) in the front wheel F side, a preset third pass area C is provided. The third pass area C has a base point in time when the second change part b appears and the area C is defined by an upper limit and a lower limit of acceptable deceleration in a predetermined time.

The determining means 50 firstly performs pass/fail determination of the front wheel ABS actuation by determining whether the first change part a, the second change part b, and the third change part c are in the first pass area A, the second pass area B, and the third pass area C, respectively. If all change parts a, b, c are in the respective pass areas A, B, C, "ABS OK" is indicated through the indicating means 51, while if any change part is out of its pass area, "ABS NG" is indicated through the indicating means 51. Further, even if a part of the first change part a, the second change part b, and the third change part c is in the first pass area A, the second pass area B, and the third pass area C, respectively, when the change part rises over the upper limit of the acceptable deceleration in the predetermined time or falls below the lower limit, "ABS NG" is indicated through the indicating means 51.

Factors affecting the waveforms include coupler detachment, brake sensor defect, tube clogging, air entrapment, pad contact failure, slip between the rollers 5, 6, 22, 23 and the wheels R, F, and operation errors such as strength or timing of braking, etc.

It is also considered that pass/fail determination of the front wheel ABS actuation is performed by determining whether a peak value of each of the first change part a, the second change part b, and the third change part c is in the first pass area A, the second pass area B, and the third pass area C, respectively. However, sampling the peak value with a smooth curve may be difficult for some waveforms. In such a case, because the peak value can not be sampled, it can happen that the front wheel ABS actuation is determined as "fail", even though the actuation should be determined as "pass". Thus, by performing pass/fail determination with the change parts of the waveforms instead of the peak value, accurate pass/fail determination can be performed.

At the same time, the calculating means 49 calculates a difference between the value constituting the first change part a in the waveform for deceleration (acceleration) in the front wheel F side and the value constituting the first change part d in the waveform for deceleration (acceleration) in the rear wheel R side (in this embodiment, a ratio of the first change part d in the rear wheel side to the first change part a in the front wheel side) and the determining means 50 performs pass/fail determination of the CBS actuation by determining whether the value here calculated is within a predetermined range I (65% to 15% of the first change part a in the front wheel side). The predetermined range I here specified is defined in consideration that interlock distribution of the brakes becomes optimal from the timing and strength of interlock of the rear wheel R to the front wheel F. Then, if the first change part d in the rear wheel side is within the predetermined range I, "CBS OK" is indicated through the indicating means 51, while if the first change part d is out of the predetermined range I, "CBS NG" is indicated through the indicating means 51.

In this way, in this embodiment, pass/fail determination of the front wheel ABS actuation is performed by sampling the first change part a, the second change part b, and the third change part c in the waveform for deceleration (acceleration) in the front wheel F side, and pass/fail determination of the CBS actuation is performed by sampling the first change part a in the waveform for deceleration (acceleration) in the front wheel F side and the first change part d in the waveform for deceleration (acceleration) in the rear wheel R side. Therefore, the inspection can be completed in a relatively early stage from the start of the front wheel ABS and CBS inspection and the inspection time can be remarkably reduced.

Although change in the waveform appears also after the third change part c in the waveform for deceleration (acceleration) in the front wheel F side, fluctuation between acceleration and deceleration is typically relatively small in the change in the waveform which appears after the third change part c, due to the well-known ABS characteristics. On the contrary, in the initial period in the ABS actuation when the first change part a, the second change part b, and the third change part c appear, change in vehicle speed is largest and therefore failure of the ABS actuation appears clearly. Thus, in this embodiment, by performing pass/fail determination based on the first change part a, the second change part b, and the third change part c in which the change in deceleration (acceleration) in the front wheel F side appears to be relatively large, reduction in the determination time is achieved while maintaining high determination accuracy.

Subsequently, the rear wheel ABS and CBS inspection is carried out. In the rear wheel ABS and CBS inspection, the drive by the engine of the two-wheeled vehicle is kept continuously from the front wheel ABS and CBS inspection and the operator adjusts to set the accelerator into a predetermined inspection start speed (e.g. 60 km/h). By keeping the drive by the engine of the two-wheeled vehicle, rotation of each of the support rollers 5, 22, 6, 23 is kept and thereby the speed-up time until the vehicle speed reaches a predetermined inspection start speed can be remarkably reduced.

When the vehicle speed reaches the predetermined inspection start speed, the operator releases the accelerator of the two-wheeled vehicle and brings the gear into the neutral state and at the same time fully inputs the rear wheel brake by stepping on the brake pedal. As a result, the two-wheeled vehicle is subjected to sudden braking at the rear wheel R. In the inspecting apparatus 1, because rotational inertial forces of the first rear wheel support roller 5 and the first front wheel support roller 22 are larger than rotational inertial forces of the second rear wheel support roller 6 and the second front wheel support roller 23 as shown in FIG. 2, slip phenomenon occurs between the rear wheel R and the first rear wheel support roller 5 due to the full input of the rear wheel brake, so that the rear wheel ABS begins to actuate. On the other hand, the second rear wheel support roller 6 follows rotational behavior of the rear wheel R. In addition, because the first front wheel support roller 22 is synchronously rotated with the first rear wheel support roller 5 via the coupling means 39, the condition of the road surface is also reproduced for the front wheel F. Further, due to the input of the rear wheel brake of the two-wheeled vehicle, the CBS actuates to cause the front wheel brake to actuate. Moreover, the front wheel F of the two-wheeled vehicle follows the rear wheel R so that the ABS actuates. Also in this case, the second front wheel support roller 23 follows rotational behavior of the front wheel F.

In the inspecting means 48, as is in the front wheel ABS and CBS inspection, rotational speeds of the second rear wheel support roller 6 and the second front wheel support roller 23 are continuously measured by the first rotary encoder 20 and the second rotary encoder 31 and a processing of calculating respective deceleration (acceleration) in the rear wheel R side and the front wheel F side from the measured value is performed by the calculating means 49. Waveforms corresponding to the deceleration (acceleration) here obtained are shown in FIG. 5. In FIG. 5, a waveform shown with a chain line is the waveform in the rear wheel R side, i.e. the waveform for deceleration (acceleration) calculated based on the number of revolutions of the second rear wheel support roller 6, while a waveform shown with a solid line is the waveform in the front wheel F side, i.e. the waveform for deceleration (acceleration) calculated based on the number of revolutions of the second front wheel support roller 23. As described above, although the waveforms of deceleration (acceleration) will be described in this embodiment, the same waveform can be obtained with torque instead of deceleration, as well.

As shown in FIG. 5, the waveform for deceleration (acceleration) calculated based on the number of revolutions of the second rear wheel support roller 6 rises (deceleration) at the instant when the rear brake is fully inputted and falls (acceleration) through a first change part e. The first change part e corresponds to change in rotational speed of the second rear wheel support roller 6 at the time when the rear wheel brake is initially in OFF state by actuation of the ABS and the following fall is caused by rotational inertia of the first rear wheel support roller 5 transmitted to the second rear wheel support roller 6 through the rear wheel R.

When the brake is in the ON state again, a second change part k appears and the second rear wheel support roller 6 decelerates. Then, when the brake is in the OFF state again, a third change part g appears and the second rear wheel support roller 6 accelerates. Thereafter, by actuation of the ABS, ON/OFF of the rear wheel brake is repeated several times.

The waveform for deceleration (acceleration) calculated based on the number of revolutions of the second front wheel support roller 23 corresponds to change in rotational speed of the second front wheel support roller 23 due to the fact that the CBS actuates to interlock the front wheel brake with the rear wheel brake and then the ABS in the front wheel F side actuates. Then, a first change part h appears at the time when the front wheel brake is initially in the OFF state by actuation of the ABS.

In the determining means 50 of the inspecting means 48, pass/fail determination is performed in a similar manner to the above described front wheel ABS and CBS inspection. That is, the determining means 50 performs pass/fail determination of the front wheel ABS actuation by determining whether the first change part e, the second change part k, and the third change part g are in the first pass area E, the second pass area K, and the third pass area G, respectively. If all change parts e, k, g are in the respective pass areas E, K, G, "ABS OK" is indicated through the indicating means 51, and if any change part is out of its pass area, "ABS NG" is indicated through the indicating means 51. Further, even if a part of the first change part e, the second change part k, and the third change part g is in the first pass area E, the second pass area K, and the third pass area G, respectively, when the change part rises over the upper limit of the acceptable deceleration in the predetermined time or falls below the lower limit, "ABS NG" is indicated through the indicating means 51.

It is also considered that pass/fail determination of the front wheel ABS actuation is performed by determining whether a peak value of each of the first change part e, the second change part k, and the third change part g is in the first pass area E, the second pass area K, and the third pass area G, respectively. However, sampling the peak value with a smooth curve may be difficult for some waveforms. In such a case, because the peak value can not be sampled, it can happen that the front wheel ABS actuation is determined as "fail", even though the actuation should be determined as "pass". Thus, by performing pass/fail determination with the change parts of the waveforms instead of the peak value, determination accuracy can be improved.

At the same time, the calculating means 49 calculates a difference between the value constituting the first change part e in the waveform for deceleration (acceleration) in the rear wheel R side and the value constituting the first change part h in the waveform for deceleration (acceleration) in the front wheel F side (in this embodiment, a ratio of the first change part h in the front wheel side to the first change part e in the rear wheel side) and the determining means 50 performs pass/fail determination of the CBS actuation by determining whether the value here calculated is within a predetermined range J (100% to 35% of the first change part e in the rear wheel side).

In some two-wheeled vehicles to be inspected, in the CBS actuation setting, the braking force of the front wheel brake interlocked in the full input of the rear wheel brake is set to be smaller than that of the rear wheel brake. If the above described rear wheel ABS and CBS inspection is performed for such a two-wheeled vehicle, it is conceivable that the second rotary encoder 31 of the front wheel F may sense the braking force which is transmitted through the coupling shaft 42 from the rear wheel R and thus the actual actuation by the front wheel brake can not be detected with high accuracy. In other words, even if all change parts e, k, g are in the respective pass areas E, K, G (pass determination for the ABS) and the first change part h in the front wheel side is within the predetermined range J (pass determination for the CBS), it is conceivable that the waveform shown in the first change part h in the front wheel side may not result from the actual actuation by the front wheel brake, but from the effect of the braking force transmitted to the front wheel F through the coupling shaft 42 from the rear wheel R.

Therefore, in the determining means 50, pass/fail determination of the CBS actuation is also performed based on temperature change of the brake disk 43 of the front wheel F obtained from the measured data of the temperature sensor 46 (a second pass/fail determining element), in addition to the pass/fail determination with the waveforms of the above described change parts (a first pass/fail determining element).

Thus, the determining means 50 calculates a differential ($\Delta T$) between temperatures before the start of the front wheel brake actuation and after the front wheel brake actuation, which are inputted from the temperature sensor 46, and performs pass/fail determination of the CBS actuation by determining whether $\Delta T$ reaches an acceptable value or not. In this way, it becomes clear whether the waveforms of the above described change parts results from the actual actuation by the front wheel brake or not, and the determination accuracy can be remarkably improved.

Then, if the first change part h in the front wheel side is within the predetermined range J and $\Delta T$ reaches the acceptable value, "CBS OK" is indicated through the indicating means 51 and if the first change part h is out of the predetermined range J or if $\Delta T$ does not reach the acceptable value, "CBS NG" is indicated through the indicating means 51.

In this embodiment, the two-wheeled vehicle is to be inspected in which the ABS actuates for both the front wheel brake and the rear wheel brake and the CBS actuates to interlock the rear wheel brake by input of only the front wheel brake and the CBS actuates to interlock the front wheel brake by input of only the rear wheel brake. As well, the two-wheeled vehicle can be inspected in which the ABS actuates for both the front wheel brake and the rear wheel brake and the CBS does not actuate by input of only the front wheel brake, but the CBS actuates to interlock the front wheel brake by input of only the rear wheel brake. The apparatus can be easily adapted to inspection of this two-wheeled vehicle by omitting the determination of the CBS in the above described front wheel ABS and CBS inspection.

Further, in this embodiment, the two-wheeled vehicle to be inspected is described in which the braking force of the front wheel brake interlocked in the full input of the rear wheel brake is set to be smaller than that of the rear wheel brake, in the CBS actuation setting. On the other hand, distribution of the braking forces in interlocking the rear wheel brake and the front wheel brake is to be set depending on the types of two-wheeled vehicles to be inspected. Therefore, as shown in FIG. 1, another temperature sensor 47 for measuring temperature of a part of a brake actuating part (not shown) provided on the rear wheel R can be provided on the rear wheel stand 3 to prepare for the case when the braking force of the rear wheel brake interlocked in the full input of the front wheel brake is set to be smaller than that of the front wheel brake. Also in this case, as is the above described case, a differential (ΔT) between temperatures before the start of the front wheel brake actuation and after the front wheel brake actuation, which are inputted from the temperature sensor 47, is calculated and pass/fail determination is performed by determining whether ΔT reaches the acceptable value or not, by the determining means 50. Thereby, determination accuracy can be remarkably improved.

In this embodiment, the rear wheel R is rotationally driven by the engine of the two-wheeled vehicle in the front wheel ABS and CBS inspection and the rear wheel ABS and CBS inspection. Alternatively, the second rear wheel support roller 6 may be rotationally driven by the motor 18 or the like while the operator brings the gear of the two-wheeled vehicle into the neutral state, for example. In this case, when the speed reaches a predetermined inspection start speed (e.g. 60 km/h) by drive of the second rear wheel support roller 6, the operator brings the clutch 17 into the OFF state just before inputting the brake.

Further, referring to FIGS. 1 and 2, in the inspecting apparatus 1 of this embodiment, the front wheel stand 4 can be moved to a suitable position only by rotating the ball screw 37 by the motor 36 so that the apparatus can be adapted to different spacing distances between the front wheel F and the rear wheel R depending on the types of two-wheeled vehicles.

In addition, although the motor 15 is normally not used, the engine can be started by the motor 15 through the second rear wheel support roller 6 and the rear wheel R with the clutch 12 in the ON state, if there is no self-starter and the engine can be started only by kick or push-start depending on the types of two-wheeled vehicles.

Further, in the inspecting apparatus 1 of this embodiment, although not shown, an auxiliary roller for stabilizing driving condition of the front wheel and the rear wheel and a duct for discharging exhaust gas from the two-wheeled vehicle to be inspected to the outside are provided, for example.

What is claimed is:

1. An apparatus for inspecting a brake system of a two-wheeled vehicle, the apparatus inspecting actuation of an anti-lock brake system and a front and rear wheel interlocking brake system provided in the two-wheeled vehicle, comprising:
   one pair of rotatable support rollers for supporting a front wheel of the two-wheeled vehicle, axes of the support rollers being parallel to each other;
   one pair of rotatable support rollers for supporting a rear wheel of the two-wheeled vehicle, axes of the support rollers being parallel to each other;
   coupling means for coupling at least one of the support rollers supporting the front wheel with at least one of the support rollers supporting the rear wheel to synchronously rotate them;
   first measuring means for measuring rotational speed of a wheel through the support roller supporting said wheel, when the anti-lock brake system actuates for each wheel of the two-wheeled vehicle;
   second measuring means for measuring temperature of at least a part of at least one of a brake actuating part provided on the front wheel and a brake actuating part provided on the rear wheel; and
   determining means for performing pass or fail determination of the brake system from a first pass or fail determining element based on data measured by the first measuring means and a second pass or fail determining element based on data measured by the second measuring means.

2. A method for inspecting a brake system of a two-wheeled vehicle, the method inspecting actuation of an anti-lock brake system and a front and rear wheel interlocking brake system provided in the two-wheeled vehicle, comprising:
   a brake inputting step for actuating the anti-lock brake system and the front and rear wheel interlocking brake system by fully inputting a brake of one wheel while rotating a front wheel of the two-wheeled vehicle supported on one pair of front wheel support rollers and rotating a rear wheel of the two-wheeled vehicle supported on one pair of rear wheel support rollers;
   a first measuring step for measuring rotational speed of the front wheel and rotational speed of the rear wheel in said brake inputting step through the respective support rollers;
   a second measuring step for measuring temperature of at least a part of at least one of a brake actuating part provided on the front wheel and a brake actuating part provided on the rear wheel in said brake inputting step; and
   a determining step for performing pass or fail determination of the brake system from a first pass or fail determining element based on data measured in the first measuring step and a second pass or fail determining element based on data measured in the second measuring step.

* * * * *